United States Patent
Reedy (10) Patent No.: US 12,365,400 B2
(45) Date of Patent: Jul. 22, 2025

(54) VEHICLE BED LATCH SYSTEM

(71) Applicant: Honda Motor Co., Ltd., Tokyo (JP)

(72) Inventor: Christopher L Reedy, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 429 days.

(21) Appl. No.: 18/161,407

(22) Filed: Jan. 30, 2023

(65) Prior Publication Data

US 2024/0253713 A1    Aug. 1, 2024

(51) Int. Cl.
*B62D 33/02* (2006.01)
*B60P 1/28* (2006.01)
*B62D 33/037* (2006.01)

(52) U.S. Cl.
CPC ........... *B62D 33/037* (2013.01); *B62D 33/02* (2013.01); *B60P 1/283* (2013.01); *B60Y 2200/20* (2013.01)

(58) Field of Classification Search
CPC .. B62D 33/02; B60P 1/28; B60P 1/283; B60P 1/286
USPC ....................................................... 296/183.2
See application file for complete search history.

(56) References Cited

U.S. PATENT DOCUMENTS

| | | | |
|---|---|---|---|
| 3,331,635 A * | 7/1967 | Moll | B60P 1/283 298/38 |
| 6,905,159 B1 * | 6/2005 | Saito | B60N 2/305 296/65.09 |
| 8,157,039 B2 | 4/2012 | Melvin et al. | |
| 8,752,878 B2 | 6/2014 | Yamamoto et al. | |
| 8,833,837 B2 | 9/2014 | Kaku et al. | |
| 8,864,208 B2 | 10/2014 | Kaku et al. | |
| 9,327,632 B1 | 5/2016 | Bartel | |
| 9,352,496 B2 | 5/2016 | Takahashi et al. | |
| 9,511,701 B2 | 12/2016 | Tsumiyama et al. | |
| 9,511,806 B2 | 12/2016 | Tsumiyama et al. | |
| 9,555,702 B2 | 1/2017 | Olli | |
| 10,493,892 B2 | 12/2019 | Tsumiyama et al. | |
| 10,640,155 B2 | 5/2020 | Sharma et al. | |
| 11,173,959 B2 | 11/2021 | Chalifour | |
| 2007/0216195 A1 * | 9/2007 | Furman | B60P 1/26 296/183.1 |
| 2016/0185406 A1 * | 6/2016 | Tsumiyama | B60P 1/28 298/17 R |
| 2017/0072976 A1 * | 3/2017 | Dechant | B62B 1/20 |
| 2018/0093602 A1 * | 4/2018 | Selzer | B60P 1/24 |

(Continued)

FOREIGN PATENT DOCUMENTS

CA    2942068 A1    8/2017

*Primary Examiner* — Gregory A Blankenship
(74) *Attorney, Agent, or Firm* — Clifford B Vaterlaus; American Honda Motor Co., Inc.

(57) ABSTRACT

A latch mechanism for a vehicle bed, such as a dump bed on an off-road utility vehicle. The latch mechanism includes a latch bar having at least one latch for latching the bed to a vehicle frame member. A latch handle is attached to the latch bar so as to rotate to move the latch bar from a latched position to an unlatched position. The latch bar may be attached to the bed to extend along the width of the bed. The latch handle may be rotated in a rotational path in a plane that is substantially parallel to the width of the bed to cause the latch bar to move in the lateral direction of the vehicle. The latch handle may also include a grip arranged so that the latch handle may be used to unlatch the bed and to move the bed with an efficient motion.

19 Claims, 5 Drawing Sheets

(56) References Cited

U.S. PATENT DOCUMENTS

| | | | |
|---|---|---|---|
| 2019/0185077 A1* | 6/2019 | Smith | B60K 17/348 |
| 2019/0211915 A1 | 7/2019 | Davis et al. | |
| 2021/0131150 A1* | 5/2021 | Martin | E05B 79/06 |
| 2021/0237802 A1* | 8/2021 | Chalifour | B62D 27/00 |
| 2022/0135145 A1 | 5/2022 | Veillette et al. | |
| 2024/0101198 A1* | 3/2024 | Hayashi | E05C 3/08 |
| 2024/0253713 A1* | 8/2024 | Reedy | B62D 33/037 |

\* cited by examiner

VEHICLE BED LATCH SYSTEM

BACKGROUND

The disclosed subject matter relates generally to latch systems. More particularly, the disclosed subject matter relates to systems for latching vehicle beds in a hauling position.

Certain conventional vehicles, such as utility vehicles, include a utility bed that is movable between a hauling position and a dumping position. Such a utility bed is sometimes referred to as a "dump bed" and is suitable to facilitate loading, transportation and unloading of cargo. Dump beds typically pivot about an axis at the rear of the vehicle such that the front of the bed can be raised to the dumping position. In the hauling position, a latching system is used to hold the bed in place.

Some of the known latching systems for vehicle beds are cumbersome to operate. Often an operator of the vehicle must perform multiple operations to unlatch and move the bed. For example, some known latching systems require the operator to move a latch handle that is positioned at a location remote from the vehicle bed. In this arrangement, the operator must move or reach from one location of the vehicle to another to unlatch the bed and then lift the front of the bed. Other arrangements require movement of latch handles in directions that make it difficult to efficiently unlatch and move the bed.

It would therefore be desirable to provide a latch system for a vehicle bed that is easy to operate. It would also be desirable to provide a latch system that improves efficiency of operation of the latch and lifting of the vehicle bed. Additionally, it would be desirable to provide a latch system for a vehicle bed that can be economical to manufacture and assemble.

SUMMARY

In accordance with one embodiment of the present disclosure, a vehicle bed latch system includes a vehicle frame member and a vehicle bed supported on the vehicle frame member. The bed extends in a longitudinal direction along a length of the vehicle and a lateral direction along a width of the vehicle. The bed is arranged to move from a first position to a second position. The latch system includes a latch bar having at least one latch for latching the bed to the vehicle frame member when the bed is in the first position. A latch handle is attached to the latch bar. The latch handle is rotatable to move the latch bar in the lateral direction to thereby unlatch the latch from the vehicle frame member.

In accordance with another embodiment of the present disclosure, a vehicle bed latch system includes a vehicle frame member and a bed supported on the vehicle frame member. The bed extends in a longitudinal direction along a length of the vehicle and a lateral direction along a width of the vehicle. The bed is arranged to move from a first position to a second position. The latch system includes a latch bar having at least one latch for latching the bed to the vehicle frame member when the bed is in the first position. The latch bar is attached to the bed and extends in the lateral direction. A latch handle is attached to the latch bar. The latch handle is rotatable to move the latch bar to thereby unlatch the latch from the vehicle frame member.

In accordance with yet a further embodiment of the present disclosure, a vehicle bed latch system includes a vehicle frame member and a bed supported on the vehicle frame member. The bed extends in a longitudinal direction along a length of the vehicle and a lateral direction along a width of the vehicle. The bed is arranged to move from a first position to a second position. The latch system includes a latch bar having at least one latch for latching the bed to the vehicle frame member when the bed is in the first position. A latch handle is attached to the latch bar and the bed. The latch handle is rotatable in a rotational path that resides in a plane, and the plane is substantially parallel to the lateral direction.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-5, wherein like numbers indicate the same or corresponding elements throughout the views.

Figure 1:
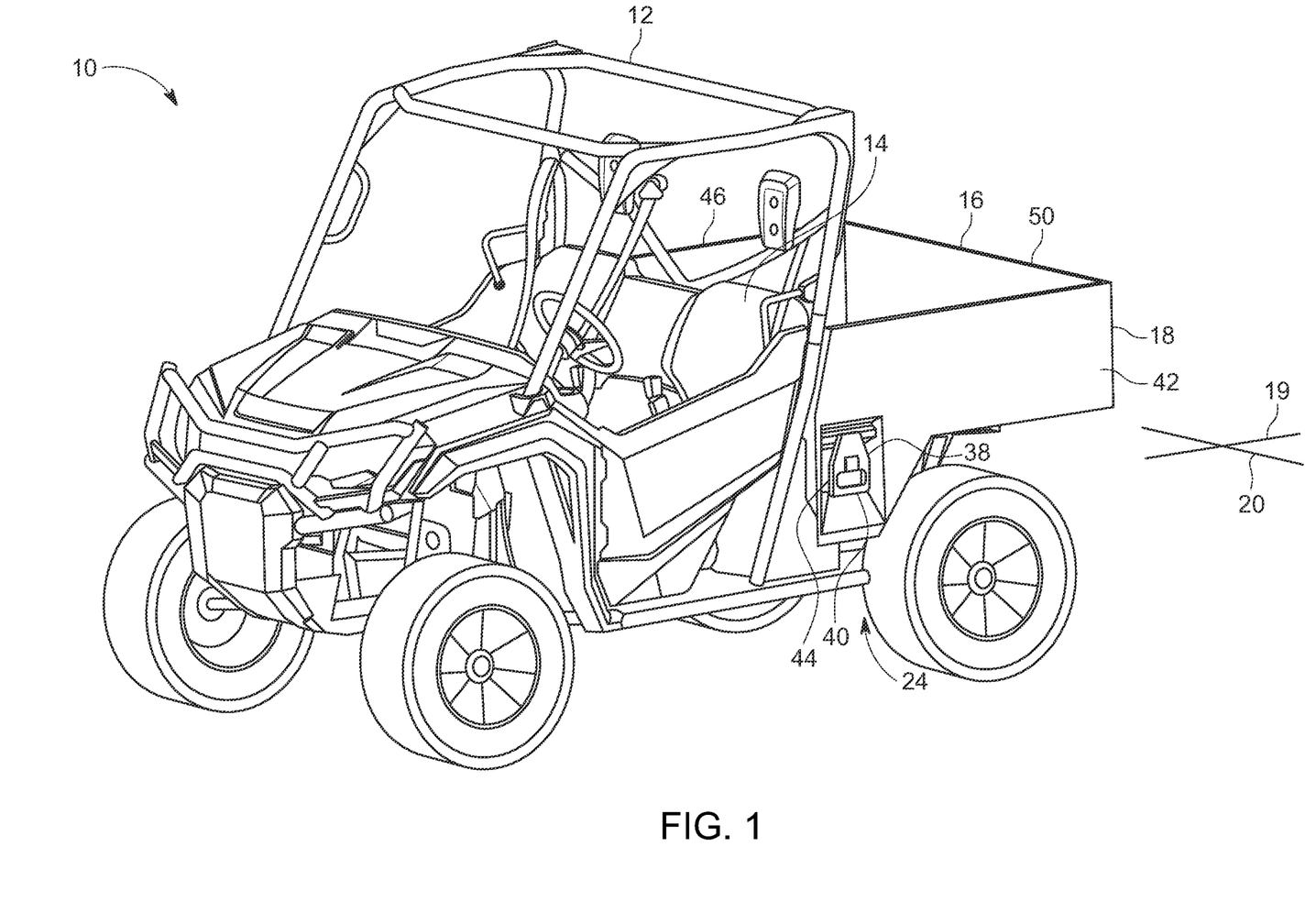
FIG. 1 is a front perspective view depicting a vehicle in accordance with one embodiment of the present disclosure, with a bed in a hauling position.

FIG. 1 illustrates a perspective view of a vehicle, indicated generally at 10, in accordance with one embodiment of the present disclosure. The vehicle 10 is shown as an off-road utility vehicle. However, vehicles in accordance with alternative embodiments can comprise any of a variety of vehicles, including all-terrain vehicles, automobiles, trucks, vans, recreational vehicles, motorcycles, carts, wagons, agricultural equipment, or construction equipment, for example.

The vehicle 10 may include a locomotive source (not shown), such as an internal combustion engine or an electric motor of any suitable size and configuration for providing a motive power to the vehicle 10. The locomotive source may be supported by the vehicle frame at a location toward a front, middle or rear of the vehicle 10. However, in alternative embodiments, the vehicle 10 may be provided without a locomotive source.

The vehicle 10 can include a passenger area or cab 12 with one or more seats 14 for a driver and one or more passengers. A bed 16 may be positioned behind the cab 12 for carrying cargo. The bed 16 may include sidewalls 18 to assist in holding the cargo within the bed 16. However, it will be appreciated that alternative embodiments may be provided in which the bed 16 is substantially flat without the sidewalls 18.

Figure 2:
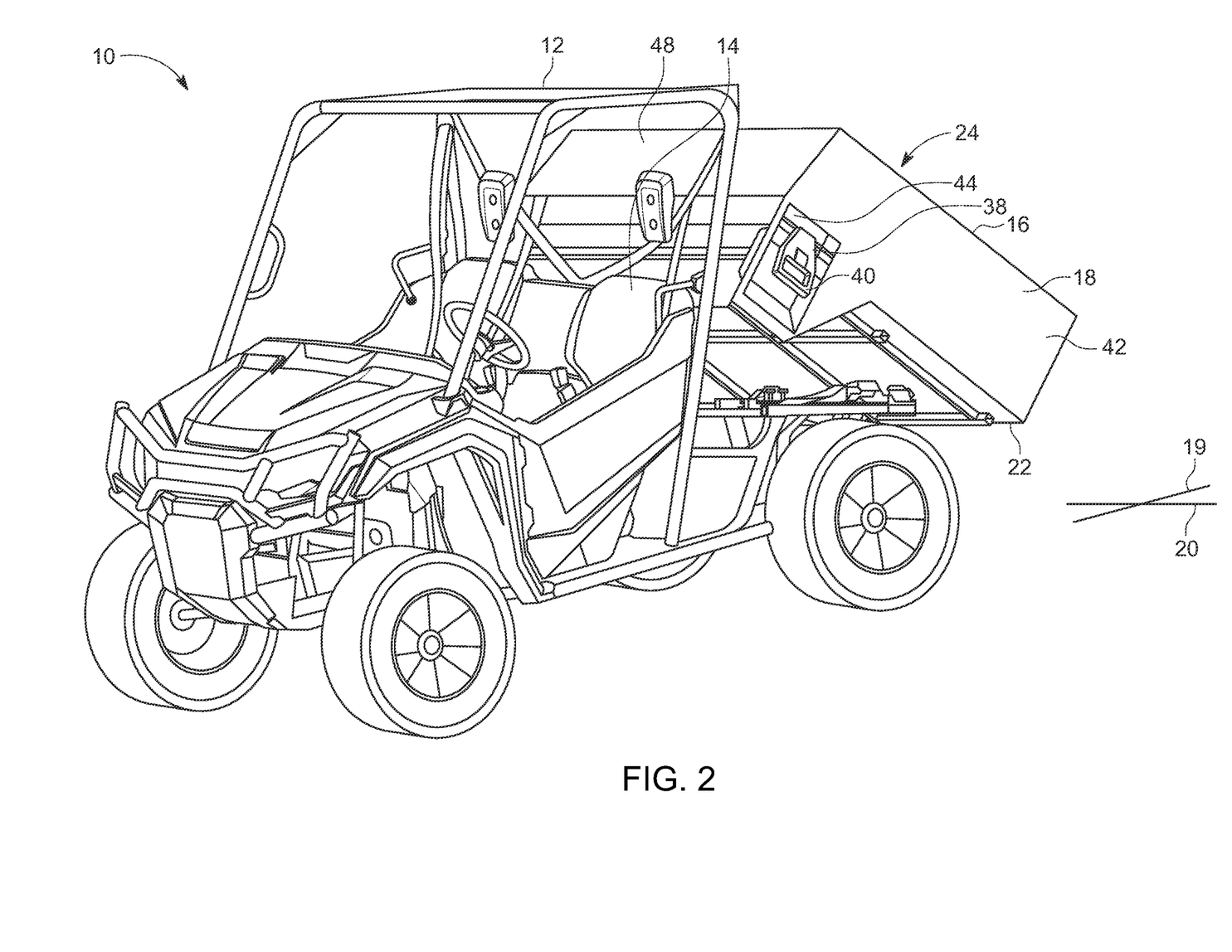
FIG. 2 is a front perspective view of the vehicle of FIG. 1 with the bed in a dumping position.

The bed 16 extends in a longitudinal direction 19 along a length of the vehicle 10 and a lateral direction 20 along a width of the vehicle 10. The bed 16 may be supported on one or more vehicle frame members 21, as shown most clearly in FIG. 3. The bed 16 may be arranged to move or rotate from a first position, as shown in FIG. 1, to a second position as shown in FIG. 2. It will be understood that in the first position, sometimes referred to as a hauling position, cargo may be loaded and transported in the bed 16. In the second position, sometimes referred to as a raised, dumping or unloading position, a front end of the bed 16 may be raised so that the bed 16 rotates and pivots about an axis 22 that extends in the lateral direction 20 at the rear of the vehicle 10. In the second position, cargo may be allowed to slide or be dumped or otherwise unloaded out the rear of the bed 16. It will be understood that alternative embodiments of the bed 16 may be configured to rotate about an axis that extends in the longitudinal direction 19 of the vehicle 10. Moreover, further alternative embodiments of the bed 16 may be configured to move in a sliding manner in the longitudinal or lateral direction of the vehicle 10, rather than in a rotational manner.

Figure 3:
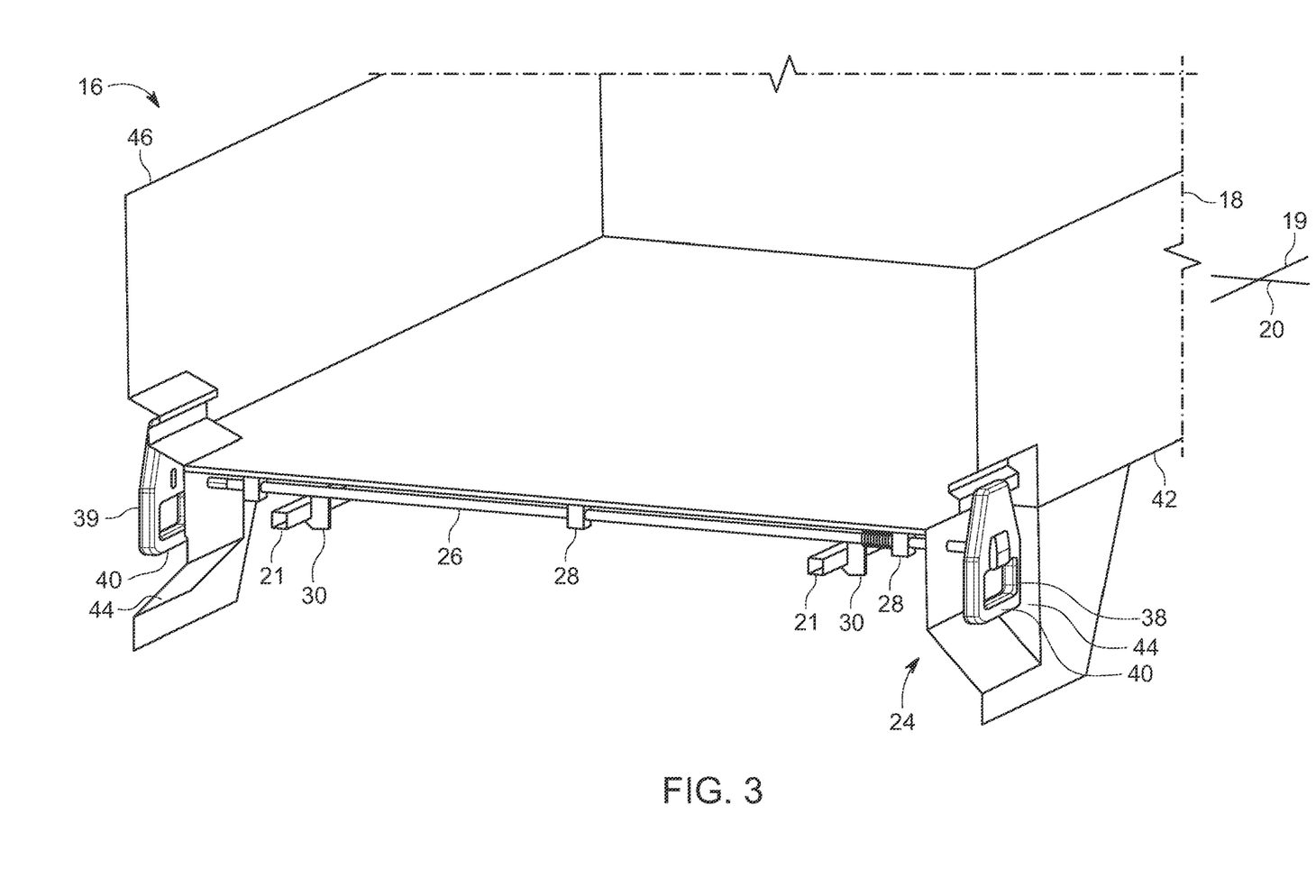
FIG. 3 is a cut-away front perspective view of a portion of the bed of FIG. 1 showing a latch mechanism in a latched position.
Figure 4:
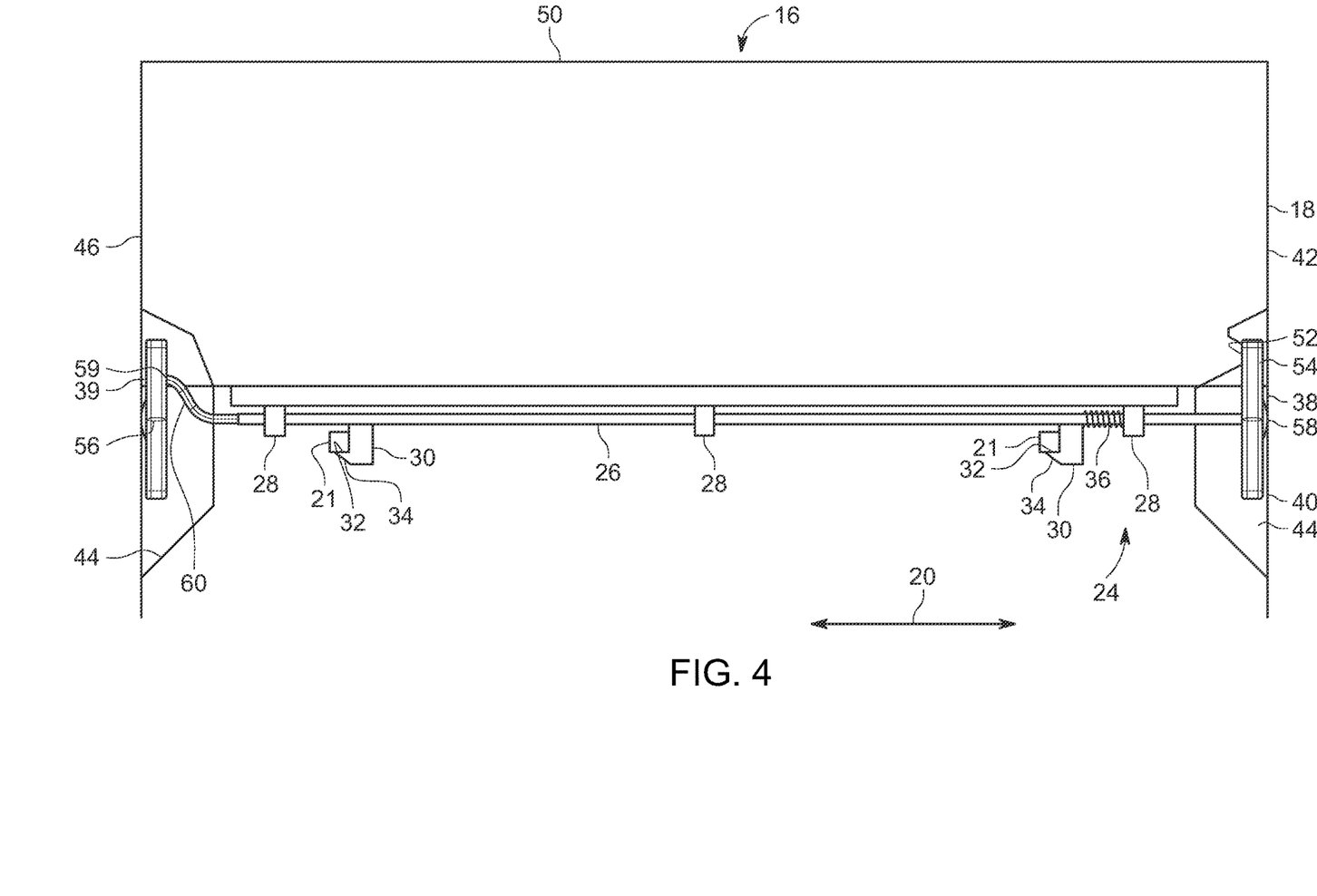
FIG. 4 is a cut-away end view of the bed of FIG. 1 showing the latch mechanism in the latched position.
Figure 5:
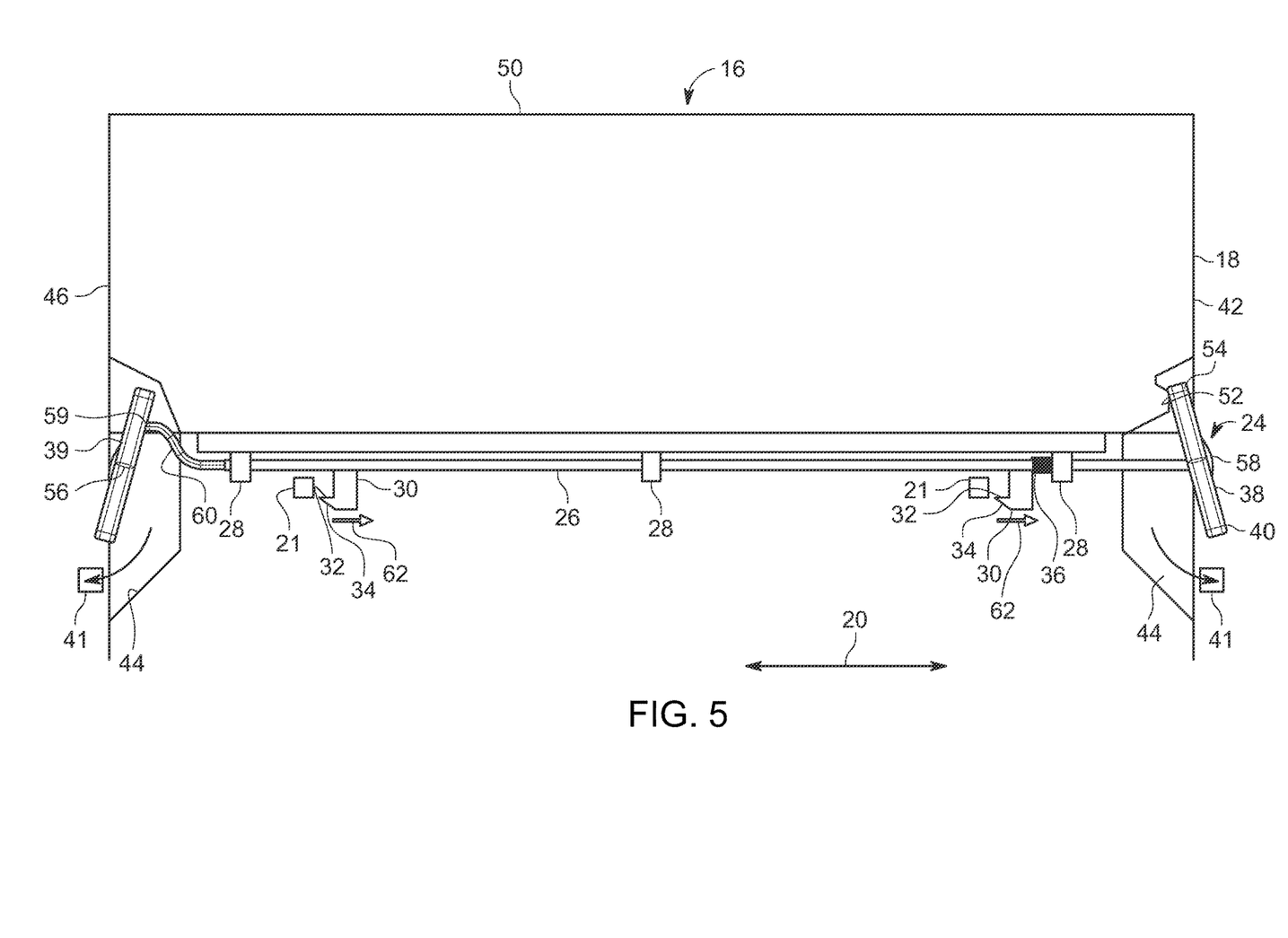
FIG. 5 is a cut-away end view of the bed of FIG. 1 showing the latch mechanism in an unlatched position.

When the bed 16 is in the first position, or hauling position, a latch mechanism indicated generally at 24 may be used to hold the bed 16 in place with respect to one or more of the vehicle frame members 21. As shown in FIGS. 3-5, the latch mechanism 24 may include a latch bar 26 that extends in the lateral direction 20 of the bed 16. The latch bar 26 may be formed of a hollow tube, a rod or flat bar or any other such member known to those skilled in the art. The latch bar 26 may be attached to the bed 16 in a manner that allows the latch bar 26 to move in the lateral direction 20 with respect to the bed 16, yet so as to remain with the bed 16 as the bed 16 moves from the hauling position to the unloading position. For example, bearings 28 that provide a space for receiving the latch bar 26 may be used to attach the latch bar 26 to the bed 16. Similarly, openings may be formed in sidewalls 18 of the bed 16 for receiving the latch bar 26 therethrough. In such arrangements, the latch bar 26 is allowed to move in the lateral direction 20, but the latch bar 26 remains attached to the bed 16.

The latch bar 26 may include at least one latch 30 for latching the bed 16 to the vehicle frame member 21 when the bed 16 is in the hauling position. The embodiment of the latch bar 26 shown in FIGS. 3-5 includes two latches 30, but it will be understood that one latch 30 or any suitable number of latches 30 may be used. The latch 30 may be formed as a hook having a mouth 32, as shown most clearly in FIGS. 4 and 5, to receive the vehicle frame member 21. The latch 30 may also include a cam surface 34 such that when the bed 16 is lowered or moved from the raised position to the hauling position, the cam surface 34 contacts the vehicle frame member 21 and moves the latch bar 26 in the lateral direction 20 to a retracted position. In this way, the latch 30 can move around the vehicle frame member 21 to receive the vehicle frame member 21 in the mouth 32 of the latch 30. One embodiment of the latch 30 may be rigidly attached to the latch bar 26 so that the latch 30 does not move with respect to the latch bar 26. For example, the latch 30 may be welded to the latch bar 26 in a fixed position, or the latch 30 may be integrally formed as a one-piece unit with the latch bar 26.

One or more springs 36 may be attached to the latch bar 26 to bias the latch 30 into engagement with the vehicle frame member 21. For example as shown in FIG. 4, a spring 36 may be positioned over a portion of the latch bar 26 between the latch 30 and a bearing 28 so as to provide a biasing force to the latch bar 26. It will be understood that other spring types, quantities and arrangements may be used to bias the latch bar 26 into engagement with the vehicle frame member 21 within the scope of the present disclosure.

A latch handle 38 may be attached to the latch bar 26 to facilitate movement of the latch bar 26. The latch handle 38 may be configured to be grasped by a user to unlatch the bed 16. The latch handle 38 may be rotatable in a rotational path that resides in a plane 41, as shown most clearly in FIG. 5. In one embodiment, the latch handle 38 may be arranged such that the plane 41 defined by the rotational path may be substantially parallel to the lateral direction 20 when the bed 16 is in the hauling position, also referred to as the lowered position or first position. Moreover, the latch handle 38 may be attached to the latch bar 26 such that rotation of the latch handle 38 moves the latch bar 26 in the lateral direction 20, as shown by the arrows 62 in FIG. 5. Movement of the latch handle 38 can thereby unlatch the latch 30 from the vehicle frame member 21.

One embodiment of the latch handle 38 is configured with a grip 40. The grip 40 may be formed as part of the handle 38, or as a rod, tube or bar having a length that extends in the longitudinal direction 19 of the vehicle 10 when the bed 16 is in the hauling position. The grip 40 can be grasped with the hand of a user such that the user can apply a suitable force to the latch handle 38 to rotate the latch handle 38 and lift the bed 16. This allows the user to also move the bed 16 to the unloading position in the same movement and with the same handle 38 used to unlatch the bed 16. Thus, unlatching and moving the bed 16 can be accomplished in a simple and efficient manner.

In one embodiment of the present disclosure, the bed 16 may include the sidewalls 18 to at least partially confine a space for carrying cargo. The sidewalls 18 may be formed of a molded plastic material or any other suitable material known to those skilled in the art, such as metal or fiberglass. Accordingly, the bed 16 may include a first sidewall 42 that extends in the longitudinal direction 19. The first sidewall 42 may include a recess 44 in an exterior surface facing an outboard side of the bed 16. The latch handle 38 may be disposed in the recess 44 to protect the latch handle 38 from being contacted or snagged as the vehicle 10 or bed 16 is moved. The recess 44 may be positioned at a forward lower area of the bed 16 and first sidewall 42. It will be understood that a similar recess 44 may be formed in a second sidewall 46 on the opposite side of the bed 16. It will also be understood that the bed 16 may also include a front wall 48, as shown most clearly in FIG. 2, and an end wall 50 or a tailgate, as shown most clearly in FIG. 1, so that the cargo area can be bounded in the longitudinal and lateral directions. The end wall 50 or tail gate can be moved or opened such that when the bed 16 is in the raised position, the contents in the bed 16 can be dumped or otherwise unloaded from the rear of the vehicle 10.

Referring to FIGS. 4 and 5, the latch handle 38 may be connected to the latch bar 26 at a first connection point 58 by means of a pin or other suitable connector to allow the handle 38 to move or rotate with respect to the latch bar 26. The latch handle 38 may be rotated such that an upper portion 54 of the latch handle 38 contacts a pivot area 52 that may be disposed on the first sidewall 42. The latch handle 38 may be allowed to slide against the pivot area 52 when the first latch handle 38 is rotated so that the first latch handle 38 and the latch bar 26 do not bind as the first latch handle 38 is rotated.

It will be understood that a second latch handle 39 may be positioned on the second sidewall 46 of the bed 16. The second latch handle 39 may be connected to the latch bar 26 at a second connection point 59. A pin or other suitable connector may also be used to connect the second latch handle 39 to the latch bar 26. For embodiments with latch handles on both sides of the bed 16, a second pivot area 56 for the second latch handle 39 may be provided in the form of a pin, for example, connecting the second latch handle 39 to the bed 16. The second pivot area 56 may be positioned on an opposite side (lower side) of the latch bar 26 as compared to the pivot area 52, which may be positioned on an upper side of the latch bar 26 for the first latch handle 38. In such arrangement, pulling the lower portion of the latch handles 38, 39 away from the bed 16 can accomplish the unlatching operation. In this way, the unlatching operation may be consistent on both sides of the bed, and the unlatching motion can allow lifting the bed 16 in an efficient manner.

It will be appreciated that in the embodiment shown in FIGS. 4 and 5, the latch bar 26 may include a bend 60. The bend 60 in the latch bar 26 allows the second pivot area 56 of the second latch handle 39 to be below the second connection point 59 of the latch bar 26 with the second latch handle 39. In contrast, the pivot area 52 of the first latch handle 38 can reside above the first connection point 58 of the latch bar 26 with the first latch handle 38. Accordingly, an operator can pull a bottom portion of either the first latch handle 38 or the second latch handle 39 to move the latch bar 26 in the same direction (to the right for example, as shown by the arrows 62 in the illustration of FIG. 5) to unlatch the latches 30 from the frame members 21 and allow the bed 16 to move. Thus, operation of the latch mechanism 24 can be the same on both sides of the vehicle 10 to simplify operation and avoid confusion.

It will be appreciated however that the locations of the connections between the latch bar 26 and the latch handles 38, 39 may be reversed. Accordingly, the second pivot area 56 of the second latch handle 39 can be above the second connection point 59. Whereas the pivot area 52 of the first latch handle 38 can reside below the first connection point 58. Moreover, further alternative connection arrangements may be used in accordance with the principles of the present disclosure.

For example, the embodiment of the latch bar 26 disclosed herein is shown to be a one-piece member. However, it will be understood that alternative embodiments of the latch bar 26 may be formed of multiple pieces. For example, the latch bar 26 may be formed of two separate pieces that contact opposite sides of a gear or pivot member (not shown) located at an interior area of the vehicle 10 between the latch handles 38, 39. Accordingly, movement of one side of the latch bar rotates the gear or pivot member so that the other side of the latch bar moves in the opposite direction. In this embodiment, the latch handles 38, 39 do not need to pivot about an area on opposite sides of the connections with the latch bar in order to achieve the same operation of the latch handles 38, 39 on both sides of the vehicle 10.

An additional alternative embodiment of the vehicle frame member 21 will now be described. In the embodiment of the present disclosure described above, the vehicle frame member 21 may be formed of a primary member that provides structural support for the vehicle 10 and/or components such as the bed 16. The primary member may extend in the longitudinal direction 19 of the vehicle 10 and the latch may engage directly with the primary member. In an alternative embodiment, the vehicle frame 21 member may include a striker (not shown) attached to the primary member. The striker may be arranged such that the latch 30 engages with the striker rather than directly with the primary member itself. In such configuration, the striker together with the primary member comprise the frame member 21 such that the latch 30 latches the bed 16 to the vehicle frame member 21 through the striker.

Operation of the vehicle latch system will now be described with reference to the embodiment of FIG. 4, which shows a cut-away end view of the bed 16 with the bed 16 in the lowered or load carrying position. The latches 30 are shown to be engaged with the frame members 21 to hold the bed 16 in the hauling position. To unlatch the bed 16, an operator can grasp the latch handle 38 or 39 at the grip 40 on a lower end and pull the latch handle 38 or 39 toward an exterior of the vehicle 10 as shown most clearly in FIG. 5. An upper portion 54 of the latch handle 38 may then contact a pivot area 52 on the bed 16 and movement of the latch handle 38 can cause the latch bar 26 to move in the lateral direction 20 as shown by the arrows 62 so that the latches 30 become disengaged from the frame members 21. In this position of the latch mechanism 24, the bed 16 may be moved to the unloading position as shown in FIG. 2. The latch handles 38, 39 can be used to lift the bed 16 with the same movement that is used to unlatch the latches 30 from the frame members 21. Accordingly, efficient operation of the latch mechanism 24 and lifting of the bed 16 can be accomplished.

It will be understood that the concepts of the present disclosure provide a mechanism 24 for latching a vehicle bed 16 that is easy and intuitive to operate. The latching mechanism 24 allows for efficient unlatching of the latch 30 and movement of the bed 16 from the hauling position to the unloading position. Moreover, the principles of the present disclosure provide a bed latching mechanism 24 that is simple to manufacture and assemble.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A vehicle bed latch system comprising:
   a vehicle frame member;
   a bed supported on the vehicle frame member, the bed extending in a longitudinal direction along a length of the vehicle and a lateral direction along a width of the vehicle, the bed arranged to move from a first position to a second position;
   a latch bar having at least one latch for latching the bed to the vehicle frame member when the bed is in the first position;
   a latch handle attached to the latch bar, the latch handle being rotatable to move the latch bar in the lateral direction to thereby unlatch the latch from the vehicle frame member.

2. The latch mechanism of claim 1, wherein the bed pivots about a rotational axis that extends in the lateral direction to move from the first position to the second position.

3. The latch system of claim 2, wherein the latch handle rotates in a rotational path that resides in a plane, and wherein the plane is substantially parallel to the lateral direction when the bed is in the first position.

4. The latch system of claim 1, wherein the latch handle comprises a grip for a user to grasp to move the bed from the first position to the second position.

5. The latch system of claim 1, wherein the bed comprises a first sidewall that extends in the longitudinal direction, and wherein the sidewall comprises a recess in an exterior surface, and wherein the latch handle is disposed in the recess.

6. The latch system of claim 1, further comprising a spring to bias the latch bar in a direction to hold the latch in an engaged position with the vehicle frame member.

7. The latch system of claim 1, wherein the latch has a cam surface that contacts the vehicle frame member when the bed is moved from the second position to the first position to cause the latch bar to move to a retracted position.

8. The latch system of claim 1, wherein the latch bar is joined to the bed so as to move with the bed when the bed moves from the first position to the second position.

9. The latch system of claim 1, wherein the latch bar is connected to the latch handle at a first connection point, wherein the latch system further comprises a second latch handle, and wherein the latch bar is connected to the second latch handle at a second connection point, wherein the latch bar comprises a bend such that the second connection point is positioned higher than the first connection point.

10. The latch system of claim 1, wherein the latch bar extends in the lateral direction across a width of the bed.

11. The latch system of claim 5, wherein the bed comprises a second sidewall that extends in the longitudinal direction on a side of the bed opposite the first sidewall, and wherein a second latch handle is connected to the latch bar at the second sidewall.

12. The latch system of claim 11, wherein the latch handle rotates about a pivot area, wherein the pivot area is positioned at one of above or below the latch bar; and
the second latch handle rotates about a second pivot area, and wherein the second pivot area is positioned at the other of above or below the latch bar.

13. The latch system of claim 1, wherein the bed pivots about a rotational axis that extends in the lateral direction;
wherein the latch handle rotates in a rotational path that resides in a plane, and wherein the plane is substantially parallel to the lateral direction when the bed is in the first position;
wherein the latch handle comprises a grip for a user to grasp to move the bed from the first position to the second position;
wherein the bed comprises a first sidewall that extends in the longitudinal direction, and wherein the first sidewall comprises a recess in an exterior surface, and wherein the latch handle is disposed in the recess;
wherein the bed comprises a second sidewall that extends in the longitudinal direction on a side of the bed opposite the first sidewall, the second sidewall comprises a second recess in a second exterior surface, and wherein a second latch handle is connected to the latch bar and disposed in the second recess;
wherein the latch handle rotates about a pivot area, wherein the pivot area is positioned at one of above or below the latch bar;
the second latch handle rotates about a second pivot area, and wherein the second pivot area is positioned at the other of above or below the latch bar;
the latch system further comprising a spring positioned over a portion of the latch bar between the latch and a bearing so as to bias the latch bar in a direction to hold the latch in an engaged position with the vehicle frame member;
wherein the latch has a cam surface that contacts the vehicle frame member when the bed is moved from the second position to the first position to cause the latch bar to move to a retracted position;
wherein the latch bar is joined to the bed so as to move with the bed when the bed moves from the first position to the second position; and
wherein the latch bar extends in the lateral direction across a width of the bed.

14. A vehicle bed latch system comprising:
a vehicle frame member;
a bed supported on the vehicle frame member, the bed extending in a longitudinal direction along a length of the vehicle and a lateral direction along a width of the vehicle, the bed arranged to move from a first position to a second position;
a latch bar having at least one latch for latching the bed to the vehicle frame member when the bed is in the first position, the latch bar attached to the bed and extending in the lateral direction;
a latch handle attached to the latch bar, the latch handle being rotatable to move the latch bar to thereby unlatch the latch from the vehicle frame member;
wherein the latch handle rotates about a pivot area, wherein the pivot area is positioned at one of above or below the latch bar; and
a second latch handle is connected to the latch bar, the second latch handle rotates about a second pivot area, and wherein the second pivot area is positioned at the other of above or below the latch bar.

15. The latch system of claim 14, wherein the latch bar is movable in the lateral direction to unlatch the latch from the vehicle frame member.

16. The latch system of claim 14, wherein the latch handle rotates in a rotational path that resides in a plane, and wherein the plane is substantially parallel to the lateral direction when the bed is in the first position.

17. A vehicle bed latch system comprising:
a vehicle frame member;
a bed supported on the vehicle frame member, the bed extending in a longitudinal direction along a length of the vehicle and a lateral direction along a width of the vehicle, the bed arranged to move from a first position to a second position;
a latch bar having at least one latch for latching the bed to the vehicle frame member when the bed is in the first position;
a latch handle attached to the latch bar and the bed, the latch handle being rotatable in a rotational path that resides in a plane, and wherein the plane is substantially parallel to the lateral direction when the bed is in the first position.

18. The latch system of claim 17, wherein the bed comprises a first sidewall that extends in the longitudinal direction, and wherein the sidewall comprises a recess in an exterior surface, and wherein the latch handle is disposed in the recess.

19. The latch system of claim 17, wherein the latch handle comprises a grip for a user to grasp to move the bed from the first position to the second position, the grip extending in the longitudinal direction when the bed is in the first position.

\* \* \* \* \*